(12) United States Patent  (10) Patent No.: US 8,622,740 B2
Segall  (45) Date of Patent: Jan. 7, 2014

(54) PYROTECHNIC AUDIO AND VISUAL EFFECTS FOR COMBAT SIMULATION

(76) Inventor: Stuart C. Segall, La Jolla, CA (US)

( * ) Notice: Subject to any disclaimer, the term of this patent is extended or adjusted under 35 U.S.C. 154(b) by 1402 days.

(21) Appl. No.: 11/745,840

(22) Filed: May 8, 2007

(65) Prior Publication Data

US 2008/0280264 A1  Nov. 13, 2008

(51) Int. Cl.
*F41A 33/00* (2006.01)
*F41A 33/04* (2006.01)
*F41G 3/26* (2006.01)

(52) U.S. Cl.
USPC ............ 434/11; 424/12; 424/16; 424/17; 424/18; 424/19; 424/24

(58) Field of Classification Search
USPC .............. 434/11, 16, 17, 18, 19, 20
See application file for complete search history.

(56) References Cited

U.S. PATENT DOCUMENTS

| | | | | | |
|---|---|---|---|---|---|
| 2,375,004 | A | * | 5/1945 | Knowles | 434/18 |
| 2,674,923 | A | * | 4/1954 | Brandt | 434/12 |
| 4,014,111 | A | * | 3/1977 | Miller | 434/11 |
| 4,114,080 | A | * | 9/1978 | Greenwood | 446/405 |
| 4,432,731 | A | * | 2/1984 | Batchie | 434/11 |
| 4,439,155 | A | * | 3/1984 | Roe | 434/12 |
| 5,074,218 | A | * | 12/1991 | Castro | 102/498 |
| 5,114,140 | A | * | 5/1992 | Barr | 472/75 |
| 5,207,579 | A | * | 5/1993 | Campagnuolo | 434/11 |
| 5,246,372 | A | * | 9/1993 | Campagnuolo et al. | 434/11 |
| 5,351,623 | A | * | 10/1994 | Kissel et al. | 102/498 |
| H1390 | H | * | 1/1995 | Campagnuolo et al. | 434/11 |
| 5,511,978 | A | * | 4/1996 | Sellers et al. | 434/11 |
| 5,944,502 | A | * | 8/1999 | Denchfield | 431/1 |
| 6,065,404 | A | * | 5/2000 | Ripingill et al. | 102/498 |
| 6,599,127 | B1 | * | 7/2003 | Hopmeier et al. | 434/16 |
| 6,837,713 | B1 | * | 1/2005 | Kough et al. | 434/11 |
| 7,354,271 | B2 | * | 4/2008 | Brunn | 434/12 |
| 7,507,089 | B2 | * | 3/2009 | Jones et al. | 434/11 |
| 7,568,431 | B1 | * | 8/2009 | Stria | 102/355 |
| 7,597,047 | B2 | * | 10/2009 | Doyle et al. | 102/355 |
| 7,922,491 | B2 | * | 4/2011 | Jones et al. | 434/11 |
| 7,927,102 | B2 | * | 4/2011 | Jones et al. | 434/11 |
| 8,011,928 | B1 | * | 9/2011 | Schaeffer et al. | 434/11 |
| 8,096,810 | B2 | * | 1/2012 | Blackburn et al. | 434/226 |
| D672,006 | S | * | 12/2012 | Mok | D22/112 |
| 8,408,907 | B2 | * | 4/2013 | Herbert et al. | 434/11 |
| 2007/0015115 | A1 | * | 1/2007 | Jones et al. | 434/11 |

* cited by examiner

*Primary Examiner* — Nikolai A Gishnock

(57) ABSTRACT

A system and method for manipulating an environment to create a tactical combat scenario requires the coordinated implementation of various actions. One requires detonating an explosion simulator to create a smoke cloud with pseudo shrapnel. Another requires activating a sound enhancer, and yet another involves making a fire-ball. The combined result of these concerted actions is a perception of a single explosive event. Importantly, personnel can be within approximately one foot of any action without suffering a significant injury.

16 Claims, 2 Drawing Sheets

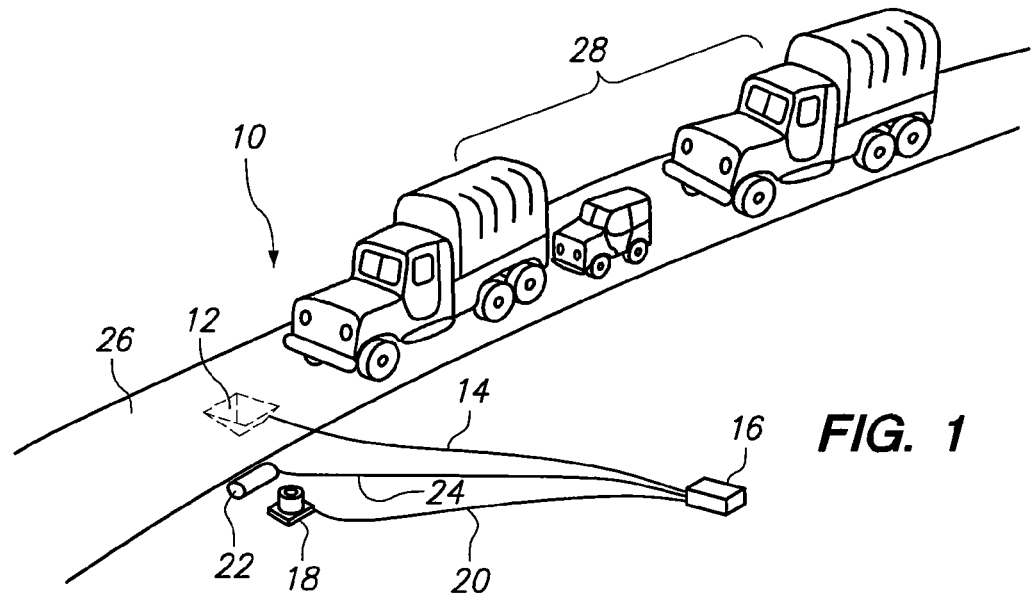
FIG. 1
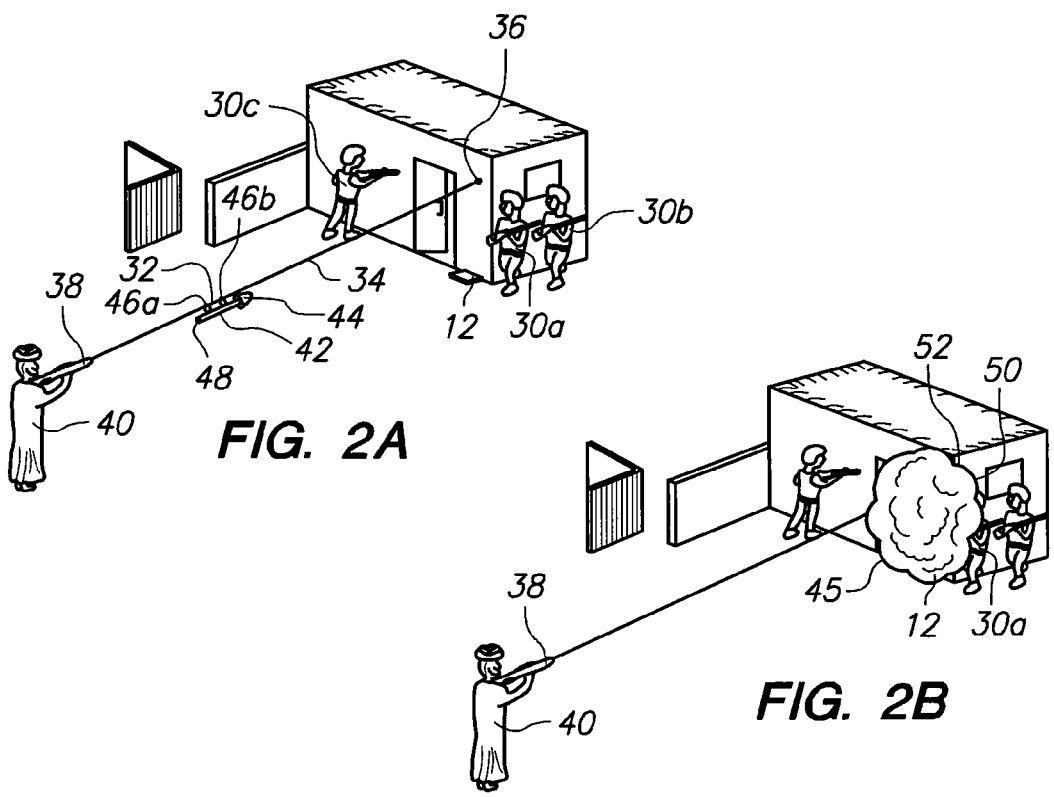
FIG. 2A
FIG. 2B

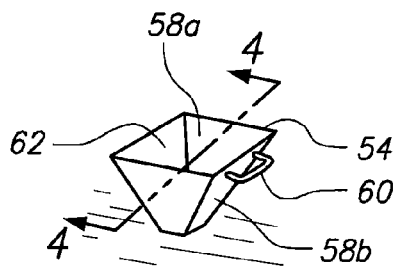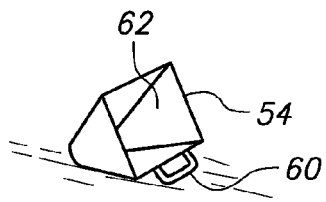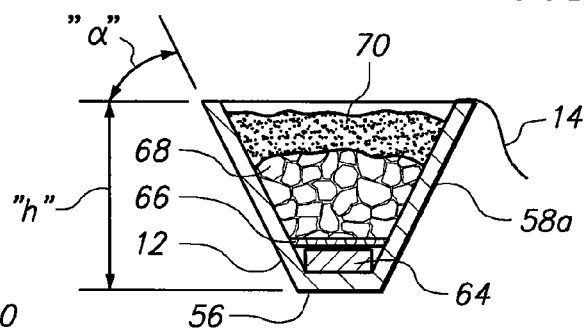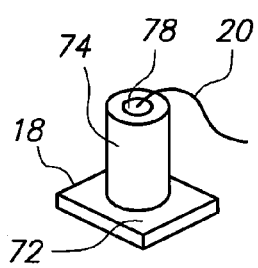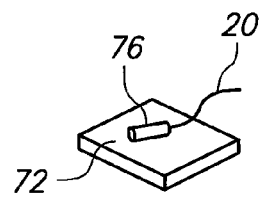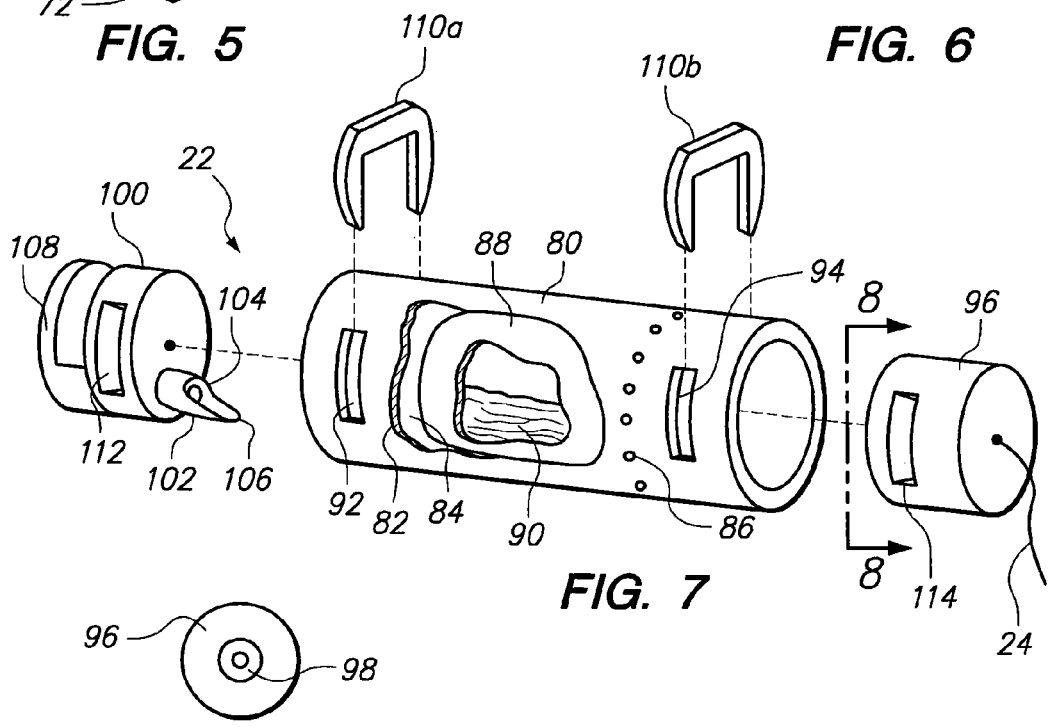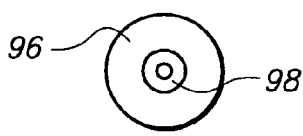

PYROTECHNIC AUDIO AND VISUAL EFFECTS FOR COMBAT SIMULATION

FIELD OF THE INVENTION

The present invention pertains generally to training aids. More particularly, the present invention pertains to training aids that are used in training exercises to simulate a tactical combat environment. The present invention is particularly, but not exclusively, useful as a system and method for safely combining elements of smoke, pseudo shrapnel, noise and fire into the perception of a single explosive event for the purpose of manipulating both the physical and sensory aspects of a training scenario.

BACKGROUND OF THE INVENTION

Data collected by the U.S. Department of Defense over many years shows that the probability of a combatant receiving a mortal wound, or sustaining a debilitating wound that effectively eliminates his/her combat effectiveness, is highest during the combatant's first few exposures to combat. The logical conclusion to be drawn from this observation is that a person is best prepared for combat by having had previous combat experiences. Training, of course, can significantly contribute to this experience. Moreover, the more realistic the training, the better prepared the individual will be for actual combat.

Heretofore, the most notable simulations of combat have been presented in the movies, and by the military in their training programs. In the movies, however, situations simulating combat are scripted, orchestrated, rehearsed and presented under tightly controlled circumstances. Every event in the simulation is planned and practiced. Importantly, every combat simulation presented in the movies is performed "for the camera." Although there is an emphasis on realism, it is not combat and, indeed, is not really presented to achieve a physical perception of actual combat. On the other hand, although military training exercises are conducted with efforts to include as much realism as possible, due to the real time flow of events the chaotic dimensions of actual combat are often restrained. In particular, the perception of hostile fire from an aggressor force that is commonplace in combat can be allowed to become unrealistically distant.

It is axiomatic that hyper-realism for the sights and sounds of a combat training environment is an important factor for the effectiveness level of the training. Importantly, it is well known that the mere perception of danger is often sufficient to create a combat response in a trainee. Further, for a training scenario, the perception of combat need not include the destructive forces that accompany ordinary explosions. Stated differently, a coordinated combination of smoke, fire and noise can simulate an actual explosion even though no destruction results, and even though the smoke, fire and noise may each come from separate sources.

In light of the above, it is an object of the present invention to provide a system and method for manipulating an environment to create a tactical combat scenario that creates a perception of an actual destructive explosion without creating destructive forces. Another object of the present invention is to provide a system and method for manipulating an environment to create a tactical combat scenario by selectively coordinating the presentation of smoke, fire and noise to create a perception of a destructive explosion. Yet another object of the present invention is to repetitively recreate combat scenarios for compliance with a military training schedule. Still another object of the present invention is to provide a system and method for manipulating an environment to create a tactical combat scenario that is easy to use and install, that is simple to operate and that is cost effective.

SUMMARY OF THE INVENTION

In accordance with the present invention, a system for creating a tactical combat scenario in an environment requires the concerted employment of explosion simulators, sound enhancers, and fire-ball generators. Though these various components can be independently employed, and sometimes are, when used together they are capable of creating a perception of a single explosive event. Importantly, the perception is created by a smoke cloud with an associated fire-ball that includes pseudo shrapnel and is accompanied by a realistic audio effect. Most importantly, the explosive event can be created within a very short distance from an individual (e.g. less than 0.30 meters or one foot) without causing any significant personal injury.

The explosive simulator of the present invention involves a "lifter" that directs a smoke cloud, with associated pseudo shrapnel, in a generally vertical direction. Structurally, this lifter includes a mortar that has a rectangular base member. Four contiguous sides extend upwardly at an angle from the edge of the base member. Together, the sides and the base member of the mortar define a receptacle. A handle that is affixed to a side of the mortar, outside the receptacle, can be incorporated with the mortar. In addition to providing a means for grasping and carrying the mortar, this handle will also orient the mortar at an angle when the mortar is tipped or tilted on its side.

In order to prepare the explosive simulator for operation, a detonator is positioned in the receptacle of the mortar, on the base member. An electrical wire is then run from the detonator to a remote controller to establish an electrical connection between the remote controller and the detonator. As envisioned for the present invention, the detonator is preferably either a 59.14 mL (2 oz.) or a 118.29 mL (4 oz.) black powder charge. Once the detonator has been positioned in the receptacle, cardboard can be positioned over the detonator. Chunks of Peruvian cork are then placed on top of the detonator/cardboard, and a powder like material, such as Fuller's earth, is positioned over the chunks of Peruvian cork. The explosive simulator is, thus, operationally loaded and can be pre-positioned in an environment, as desired.

Sound enhancers for use with the present invention are generally hollow metal tubes that are affixed (i.e. welded) perpendicularly onto a metal base plate. A sound making device, comprised of aluminum and potassium percholate powder, can then be dropped into the lumen of the hollow tube. Like the explosive device, an electrical wire is run from the sound making device to the remote controller.

Fire-balls are generated for the present invention by a device sometimes referred to herein as a "MAPP (methyacetylene-propadiene propane) Popper," "Propane Popper," or fire-ball generator. (MAPP (methylacetylene-propadiene propane) gas is a mixture of liquefied petroleum gas [LPG] and methylacetylene-propadiene. MAPP (methylacetylene-propadiene propane) is the trademark for a product of the Dow Chemical Company.) For the present invention, this fire-ball generator includes a hollow cylinder having a wall that defines a chamber. Further, the wall is formed with a plurality of air vents that extend through the wall near an end of the cylinder. Also included is a fluid container that is positioned in the chamber for movement between first and second end caps that are respectively engaged to the ends of the cylinder. In detail, the first end cap has a hollow probe that projects from the end cap and into the chamber. At the other end of the cylinder, the second end cap is formed with a depression for receiving an explosive charge. This explosive charge is connected to the remote controller.

In the operation of the fire-ball generator, when the explosive charge is exploded by the remote controller, the fluid container is driven against the probe. This causes the probe to pierce the fluid container, and thereby expel fluid from the container through the probe, which vaporizes under atmospheric pressure. Simultaneously, sparks from the explosive charge are directed through the vents in the wall of the cylinder for contact with the expelled fluid outside the cylinder. This generates the fire-ball. In addition to the components mentioned above, the fire-ball generator can also include a fluid deflector that is mounted on the first end cap, outside the chamber, but in fluid communication with the hollow probe. Further, this deflector can be mounted for rotation on the first end cap. Thus, when fluid is expelled from the container through the probe, the deflector can be oriented to spray the fluid (gas) in a predetermined direction.

As envisioned for the present invention, the explosive simulator can be pre-positioned in an environment, as desired. The sound enhancer can then also be pre-positioned at a first predetermined distance from the explosion simulator. Additionally, the "popper," fire-ball generator, may also be pre-positioned at a second predetermined distance from the explosion simulator. Depending on the particular training scenario, these first and second distances may be substantially the same, or quite different from each other. Moreover, the first predetermined distance may be less than one foot, or greater than twenty feet, and the position of the fire-ball generator can be similarly varied.

In line with the above disclosure, an implementation of the system of the present invention requires pre-placement of the components in the environment, and absolute control of their detonations or activations by the remote controller. With this in mind, an explosion simulator can be positioned to project its smoke cloud upwardly, or at an angle (if the mortar is tipped onto its handle side). Further, the explosion simulator can be positioned directly on the ground, or buried in a road bed. In each case, a sound enhancer can be appropriately positioned adjacent the explosion simulator or at an extended distance from the explosion simulator. A fire-ball generator can be similarly employed.

As a specific example of an employment of the present invention, consider the use of a pseudo RPG (Rocket-Propelled-Grenade). In this example, an explosive simulator can be pre-positioned near a predetermined location where the pseudo RPG is to be aimed. Additionally, a sound enhancer can be pre-positioned within less than a foot of the explosion simulator. And, a fire-ball generator can be similarly positioned. A wire is then connected between a launch pad and the predetermined location. The pseudo RPG is actually an elongated, cylindrical shaped stick having a plastic-foam cone mounted on its front end, with the stick connected for movement along the wire. When a propellant on the aft-end of the stick is energized, the stick and cone (pseudo RPG), moves from the launch pad and along the wire to the point at the predetermined location in the environment. When the pseudo RPG reaches the predetermined location, the remote controller detonates the explosion simulator and activates the sound enhancer and the fire-ball generator.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of an employment of the system of the present invention for simulating an IED (Improvised Explosive Device) attack on a convoy;

FIG. 2A is a perspective view of a pseudo RPG attack prior to an explosive event;

FIG. 2B is a view of the attack shown in FIG. 2A at the time of the explosive event;

FIG. 3A is a perspective view of a mortar for use as a component of an explosion simulator in accordance with the present invention;

FIG. 3B is a view of the mortar shown in FIG. 3A when tipped on its side;

FIG. 4 is a cross sectional view of an explosion simulator as would be seen along the line 4-4 in FIG. 3A when the mortar has been loaded;

FIG. 5 is a perspective view of a sound enhancer in accordance with the present invention;

FIG. 6 is a perspective view of a metal plate for use with a sound making device in accordance with the present invention;

FIG. 7 is an exploded view of a fire-ball generator in accordance with the present invention; and FIG. 8 is an elevation end view of a cap for the fire-ball generator as seen along the line 8-8 in FIG. 7.

DESCRIPTION OF THE PREFERRED EMBODIMENTS

Referring initially to FIG. 1, a system in accordance with the present invention is shown and is generally designated 10. As shown, the system 10 includes an explosion simulator 12 that is connected via an electrical wire 14 to a remote controller 16. Also included is a sound enhancer 18 that is connected via an electrical wire 20 to the remote controller 16, and a fire-ball generator 22 that is likewise connected via an electrical wire 24 to the remote controller 16. It will be appreciated by the skilled artisan that although electrical wires 14, 20 and 24 are shown in FIG. 1 for connection with the remote controller 16, the wires 14, 20 and 24 are exemplary. These connections, alternatively, may be electronic, and therefore wireless. As shown, in FIG. 1, the system 10 is being employed with the explosion simulator 12 buried in a road bed 26 for simulating an Improvised Explosive Device (IED) attack on a convoy 28.

In FIG. 2A, the system 10 is shown being employed for the simulation of an attack on troops 30, of which the troops 30a, 30b and 30c are exemplary. In this case, the troops 30 are shown being attacked by a pseudo Rocket Propelled Grenade (RPG) 32. For this scenario, the pseudo RPG 32 requires use of a wire 34 that has one end attached to a predetermined point 36 at a location in an environment where the troops 30 are expected to be, some time during a training exercise. The other end of the wire 34 is attached to a launch pad 38. In FIG. 2A, the launch pad 38 is shown to be a hand-held device that is being carried by an actor 40 who is dressed as an indigenous person. It is to be appreciated, however, that the launch pad 38 need not be hand-held, and instead may be located wherever desired. Further, the wire 34 may initially be buried and raised from the ground by the actor 40 before activation of the pseudo RPG 32. In any event, during an operation of the pseudo RPG 32, the wire 34 should be above head height in order to avoid garroting the troops 30 or the RPG from striking the troops 30. In detail, the pseudo RPG 32 includes a stick 42 that has a plastic-foam cone 44 attached to its fore end. Eyelets 46a and 46b connect the stick 42 to the wire 34, and a propellant 48 at the aft end of the stick 42 propels the pseudo RPG 32 along the wire 34 from the launch pad 38 to the predetermined point 36.

After the pseudo RPG 32 arrives at the predetermined point 36, FIG. 2B shows there is an explosive event 45. Specifically, to create this explosive event 45 an explosion simulator 12 is detonated. The result is a smoke cloud 50, as well as accompanying pseudo shrapnel 52. As indicated in FIG. 2B, the explosive event 45 is directed upward. Consequently, although the troop 30a may, perhaps, be within a foot of the explosion simulator 12, he/she may well be startled and frightened, but will not be injured.

An important part of the explosion simulator 12 (i.e. "lifter") is a mortar 54, such as the one shown in FIG. 3A. For purposes of the present invention, the mortar 54 can be positioned either upright (FIG. 3A), or tilted (FIG. 3B). The structural components of the mortar 54, as well as the contents that make it operational, are best appreciated by a cross-reference to FIGS. 3A, 3B and 4. In FIG. 4 is will be seen that the mortar 54 has a base member 56 that is substantially, though not necessarily, rectangular. Extending upward from this base member 56 is a plurality of side 58, of which the sides 58a and 58b are exemplary. In detail, the sides 58 are sloped upwardly from the base member 56 at an angle "a" to a height "h" (see FIG. 4). Further, a handle 60 can be affixed to a side 58 of the mortar 54 for the purposes of carrying the mortar 54 or supporting the mortar 54 when it is tilted (see FIG. 3B). With this structure, the mortar 54 forms a chamber 62 for holding contents that will create the explosive event 45 for explosion simulator 12.

The contents used for loading the mortar 54 are shown in FIG. 4 and include (from bottom to top): a detonator 64, cardboard 66 (optional); cork chunks 68 and a powder material 70. Preferably, the detonator 64 is black powder and is formed either in a 2 oz. or 4 oz. block. The detonator 64 is then connected via the wire 14 to the remote controller 16. For the present invention, the cork chunks 68 are preferably a "Peruvian cork," and the powder material 70 is preferably a commercially available material known as "Fuller's earth."

Referring now to FIGS. 5 and 6, two embodiments are shown for a sound enhancer 18 in accordance with the present invention. In FIG. 5 it is seen that the sound enhancer 18 includes a base plate 72 on which a hollow tube 74 has been attached. In FIG. 6, only the base plate 72 is used. For both embodiments, a noise maker 76 of a type well known in the art, comprised of aluminum and potassium percholate powder, is attached to the wire 20. In the case of the embodiment shown in FIG. 5, the noise maker 76 is positioned in the lumen 78 of the hollow tube 74. In both cases, the wire 20 is electrically connected to the remote controller 16 for selective activation.

In FIG. 7 it will be seen that a fire-ball generator 22 (i.e. MAPP (methylacetylene-propadiene propane) Popper) as envisioned for the present invention includes a hollow cylinder 80. The cylinder 80 has a wall 82 that defines a chamber 84, and it has a plurality of air vents 86 that pass through the wall 82. FIG. 7 also shows a fluid container 88 positioned inside the chamber 84 that contains a flammable liquid 90, such as propane or MAPP (methylacetylene-propadiene propane) gas. It is also shown in FIG. 7 that the hollow cylinder 80 is formed with notches 92 and 94. As will be appreciated by the skilled artisan, the notches 92 and 94 are each one of a pair of opposed notches 92, 94.

Still referring to FIG. 7 it is seen that the fire-ball generator 22 includes an end cap 96 that is formed with a depression 98 (see FIG. 8) for receiving an explosive charge (not shown). The wire 24 is then attached to the explosive charge for detonation by the remote controller 16. FIG. 7 also shows the fire-ball generator 22 includes an end cap 100 that has a hollow probe 102. More specifically, the hollow probe 102 is formed with a lumen 104, and has a blade 106 that projects from the end cap 100. Further, the end cap 100 can include a fluid deflector 108 that is mounted for rotation on the end cap 100.

In the assembly of the fire-ball generator 22, the fluid container 88 is first positioned in the chamber 84 of the hollow cylinder 80. The end cap 100 is then placed with its probe 102 projecting into the chamber 84, and the yoke 110a is engaged with the hollow cylinder 80. Specifically, for this engagement the yoke 110a extends through the notch 92 for engagement with the notch 112 on end cap 100. Likewise, the end cap 96 is engaged with the hollow cylinder 80 as the yoke 110b extends through the notch 94 for engagement with the notch 114 on end cap 96.

In the operation of the fire-ball generator 22, the fire-ball generator 22 is positioned horizontally so that the probe 102 is aligned with the flammable liquid 90 in fluid container 88. The remote controller 16 then detonates the explosive charge held in the depression 98 on end cap 96. With this detonation, the fluid container 88 is driven into contact with the blade 106 of probe 102. This causes the probe 102 to pierce the fluid container 88 and to eject the flammable liquid 90 from the fluid container 88, vaporizing the liquid under atmospheric pressure to form a gas cloud. Specifically, the flammable liquid 90 exits the fluid container 88 via the lumen 104 of probe 102 and is thereafter spewed outwardly, as a gas, in a direction determined by the orientation of the fluid deflector 108. As this gas is leaving the fluid deflector 108, sparks from the detonation of the explosive charge exit the hollow cylinder 80 via the air vents 86. When these sparks contact the gas the fire ball is generated.

While the particular Pyrotechnic Audio and Visual Effects for Combat Simulation as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for manipulating an environment to create a tactical combat scenario which comprises:
    at least one explosion simulator pre-positioned in the environment, the explosion simulator including a detonator, with a powder material to present a smoke cloud and a plurality of cork chunks to mimic pseudo shrapnel upon detonation of the detonator;
    a sound enhancer pre-positioned at a first predetermined distance from the explosion simulator;
    a remote controller;
    a fire-ball generator pre-positioned at a second pre-determined distance from the explosion simulator, said fire-ball generator having a hollow cylinder having a wall defining a chamber, wherein the cylinder has a first end and a second end with a plurality of air vents formed through the wall near the second end;
    a fluid container positioned in the chamber of the hollow cylinder for movement between the first and second ends thereof;
    a first end cap fixedly engageable with the first end of the cylinder, the first end cap having a hollow probe formed with a blade projecting therefrom and into the chamber of the cylinder when the first end cap is engaged with the first end of the cylinder; and a second end cap fixedly engageable with the second end of the cylinder, the second end cap being formed with a depression for receiving an explosive charge therein, with the explosive charge being responsive to the remote controller to explode and drive the fluid container against the probe to impale on said blade to expel fluid from the container through the probe, and to direct sparks through the vents for contact with expelled fluid outside the cylinder to generate a fire-ball; and an electrical means for connecting the remote controller with the detonator to selectively detonate the explosion simulator.

2. A system as recited in claim 1 further comprising:

an electrical means for connecting the remote controller with the sound enhancer to selectively activate the sound enhancer; and an electrical means for connecting the remote controller with the fire-ball generator to selectively activate the fire-ball generator.

3. A system as recited in claim 1 wherein the explosion simulator further comprises:

a substantially flat base member bounded by an edge; and a plurality of sides, wherein each side projects outwardly at an angle from the edge of the base member, and each side is integral with the base member and with an adjacent side to create a mortar, wherein the mortar defines a receptacle bounded by the base member and the plurality of sides for receiving the detonator, the powder material, and the cork chunks therein.

4. A system as recited in claim 3 wherein the base member is rectangular and the mortar further comprises a handle affixed to one side thereof.

5. A system as recited in claim 1 wherein the sound enhancer is pre-positioned at a predetermined distance from the explosion simulator; and wherein an electrical means connects the remote controller with the sound enhancer to selectively activate the sound enhancer.

6. A system as recited in claim 5 wherein the sound enhancer comprises:

a base plate; a hollow tube formed with a lumen, and having a first end mounted on the base plate with an open second end to provide access into the lumen of the tube; and a noise making device positioned in the lumen of the tube, wherein the noise making device is electrically connected to the electrical means for connecting the remote controller with the sound enhancer.

7. A system as recited in claim 1 wherein the fire-ball generator is pre-positioned at a predetermined distance from the explosion simulator and wherein an electrical means for activation is connected to the remote controller with the fire-ball generator to selectively activate the fire-ball generator.

8. A system as recited in claim 1 further comprising:

a fluid deflector mounted on the first end cap in fluid communication with the hollow probe to spray fluid expelled from the container in a predetermined direction; and a means mounted on the cylinder and connected with the fluid deflector for moving the fluid deflector relative to the cylinder.

9. A system as recited in claim 1 wherein the fluid in the container is selected from a group consisting of propane or MAPP (methylacetylene-propadiene propane) gas.

10. A system as recited in claim 1 further comprising a pseudo RPG device, the device comprising:

a wire having a first end and a second end, with the first end connected to a launch pad and the second end connected to a point at a predetermined location in the environment;

an elongated cylindrical shaped stick connected to the wire for movement along the wire, the stick having a first end and a second end;

a plastic-foam cone mounted on the first end of the stick;

a propellant mounted on the second end of the stick; and a means for energizing the propellant to move the stick and cone from the launch pad and along the wire to the point at the predetermined location in the environment.

11. A system for manipulating an environment to create a tactical combat scenario which comprises:

an explosion simulator for generating a smoke cloud at a predetermined location in the environment;

a sound generator for providing an explosive noise at a first predetermined distance from the location in the environment;

a fire-ball generator for making a fire-ball at a second predetermined distance from the location in the environment wherein the fire-ball generator includes a hollow cylinder having a wall defining a chamber, wherein the cylinder has a first end and a second end and a fluid container positioned in the chamber of the hollow cylinder for movement between the first and second ends thereof wherein a first end cap is fixedly engageable with the first end of the cylinder and having a hollow probe formed with a blade projecting therefrom and into the chamber of the cylinder when the first end cap is engaged with the first end of the cylinder; and a second end cap fixedly engageable with the second end of the cylinder and formed with a depression for receiving an explosive charge therein, with the explosive charge being responsive to a remote controller to explode and drive the fluid container against the probe to impale on said blade to expel fluid from the container through the probe, and to direct sparks through the vents for contact with expelled fluid outside the cylinder to generate a fire-ball;

a fluid deflector to orient the fire-ball in a pre-determined direction; and a remote controller for selectively detonating the smoke cloud generating means, and for selectively activating the explosive noise means and the fire-ball means to create a perception of a single explosion.

12. A system as recited in claim 11 wherein the explosion simulator comprises:

a substantially flat base member bounded by an edge;

a plurality of sides, wherein each side projects outwardly at an angle from the edge of the base member, and each side is integral with the base member and with an adjacent side to create a mortar, wherein the mortar defines a receptacle bounded by the base member and the plurality of sides;

a detonator positioned in the receptacle;

a powder material and a plurality of cork chunks positioned in the receptacle with the detonator; and an electrical means for connecting the remote controller with the detonator to selectively detonate the explosion simulator for presentation of the powder material as a smoke cloud and the plurality of cork chunks as pseudo shrapnel.

13. A system as recited in claim 11 wherein the sound generator comprises:

a base plate;

a hollow tube formed with a lumen, and having a first end mounted on the base plate with an open second end to provide access into the lumen of the tube; and a noise making device positioned in the lumen of the tube, wherein the noise making device is electrically connected to the remote controller.

14. A system as recited in claim 11 wherein the fire-ball generator comprises:

a hollow cylinder having a wall defining a chamber, wherein the cylinder has a first end and a second end with a plurality of air vents formed through the wall near the second end;

a fluid container positioned in the chamber of the hollow cylinder for movement between the first and second ends thereof;

a first end cap fixedly engageable with the first end of the cylinder, the first end cap having a hollow probe projecting therefrom and into the chamber of the cylinder when the first end cap is engaged with the first end of the cylinder, and wherein the fluid deflector is mounted on the first end cap in fluid communication with the hollow probe to spray expelled fluid from the container;

a second end cap fixedly engageable with the second end of the cylinder, the second end cap being formed with a depression for receiving an explosive charge therein, with the explosive charge being responsive to the remote controller to explode and drive the fluid container against the probe to expel fluid from the container through the probe, and to direct sparks through the vents for contact with expelled fluid outside the cylinder to generate a fire-ball;

a fluid deflector mounted on the first end cap in fluid communication with the hollow probe to spray fluid expelled from the container in a predetermined direction; and a means mounted on the cylinder and connected with the fluid deflector for moving the fluid deflector relative to the cylinder.

15. A system as recited in claim 11 wherein the first predetermined distance is less than 0.61 meters (two feet).

16. A system as recited in claim 11 wherein the first predetermined distance is greater than 6.09 meters (twenty feet).

* * * * *